United States Patent [19]

Yoshimura

[11] Patent Number: 4,733,387
[45] Date of Patent: Mar. 22, 1988

[54] DISC LOADING/UNLOADING APPARATUS

[75] Inventor: Yasuhiko Yoshimura, Yokohama, Japan

[73] Assignee: Kabushiki Kaisha Toshiba, Kawasaki, Japan

[21] Appl. No.: 905,931

[22] Filed: Sep. 10, 1986

[30] Foreign Application Priority Data

Sep. 11, 1985 [JP] Japan .................. 60-200866

[51] Int. Cl.$^4$ .................. G11B 17/04; G11B 25/04
[52] U.S. Cl. .................................................. 369/77.1
[58] Field of Search ........................................ 369/77.1

[56] References Cited

U.S. PATENT DOCUMENTS

| 2,939,713 | 6/1960 | Winter | 369/77.1 |
| 4,523,306 | 6/1985 | Staar | 369/77.1 |
| 4,627,042 | 12/1986 | Hara | 369/77.1 |
| 4,641,298 | 2/1987 | Ikedo et al. | 369/77.1 |

FOREIGN PATENT DOCUMENTS 59-144074  8/1984  Japan .

Primary Examiner—Steven L. Stephan
Attorney, Agent, or Firm—Finnegan, Henderson, Farabow, Garrett & Dunner

[57] ABSTRACT

A disc loading/unloading apparatus according to the present invention is driven by motor power in interlock with the insertion condition of a disc and pushing out the disc from the operating position outside the apparatus. The apparatus includes positioning members for contacting the outer perimeter of the disc at spaced locations on the perimeter upon insertion of the disc into the opening, a spring for urging the positioning members against the outer perimeter of the disc for holding the disc in a loaded position and a disc ejection mechanism for ejecting the disc from the loaded position. The disc ejection mechanism includes an unloading lever for pushing the disc toward the opening and a rotatable cam for counteracting the biasing force of the spring and releasing the disc from the urging of the spring until the disc moves toward the opening beyond a predetermined position.

14 Claims, 22 Drawing Figures

DISC LOADING/UNLOADING APPARATUS

BACKGROUND OF THE INVENTION

1. Field of the Invention

This invention relates to a disc loading/unloading apparatus suitable to use for disc players such as compact disc players and video disc players.

2. Description of the Prior Art

As is well known, in the fields of audio equipment and video image equipment, for example, compact discs and video discs have been developed in which information signals such as sound signals and image signals are converted into a digitalized data, and are recorded on a disc for reproducing a record having as high density and as high fidelity as possible. As a result, disc loading/unloading apparatus have been made as versatile and sophisticated as the compact disc players and video disc players which reproduce audio and video information from such compact discs and video discs.

In recent years, introduction of compact disc players described above into use in automobiles, that is, so-called car-use, has been promoted. In this case, for a compact disc player for auto installation, a disc loading-/unloading apparatus of the so-called slot-in type has been used. In these disc players, when an operator of the disc player pushes a disc into a disc receiving slot or a disc insert port of the player up to a fixed depth, the disc is automatically pulled inside the disc player by a motor and then the disc is set in a reproducible position. Such discs have has been used extensively because of their good operability.

A conventional disc loading/unloading apparatus for slot-in type disc players includes a disc tray and a positioning mechanism. The disc tray is made movable inside the disc player between an unloading position near a disc receiving slot or a disc insert port formed on a front of the disc player and a loading position, where a disc may be played while maintained in a horizontal condition. When an operator inserts a disc into the disc insert port up to a fixed depth, the disc is pulled inside the disc player by a motor, and is loaded on the disc tray. After that, the disc tray and the disc are moved to the loading position by the motor. At the loading position, the disc is clamped by a turntable and a disc clamper set in rotatable condition, that is, in reproducible condition for playing the disc.

The positioning mechanism is provided with a pair of positioning members which are biased by a spring suspended therebetween or the like so as to hold the disc at its opposite peripheral portions in the radial direction. During the loading operation of the disc, the disc inserted into the port pushes open the pair of positioning members. When the disc is laid on the disc tray, the disc is stably held between the positioning members. After the disc tray is moved to the loading position, and the positioning members are parted from the disc, the disc is ready to be played.

When a reproduction of the disc is finished or when an eject operating element is activated, the disc tray is moved to the unloading position by the power of the motor, and then the disc is pulled out from the disc tray by the motor power. At this time, the disc pushes open the pair of positioning members once and is pushed out from the disc tray until a prescribed part of the disc is projected outside the disc insert port. Then, the operator can pull out the disc from the disc player by holding the projected portion of the disc.

However, in the conventional disc loading/unloading apparatus of slot-in type disc player as described above, the following problems arise. First, when the disc goes in and out the disc insert port, it pushes open the pair of positioning members once. No problem occurs in this phase, since an operator pushes the disc into the disc insert port by his/her hand. However, during the unloading operation, the disc must push open the disc positioning members in driving from the loading position to the unloading position by the motor power. Thus, a large load for pushing open the disc positioning members is needed from the motor. Therefore, it is necessary to use a large-sized motor having large torque. This requires that the size of the player be larger, and that greater power be consumed.

If the biasing force of the spring or the like applied to the pair of positioning members is decreased to decrease the load applied against the motor, there is a fear that the positioning of the disc may not be performed correctly.

Further, in the conventional disc loading/unloading apparatus of a slot-in type disc player, when unloading the disc from the disc player, the projection of the disc from the disc insert port is often insufficient, so that it is difficult for the operator to take out the disc from the disc player.

SUMMARY OF THE INVENTION

Accordingly, a general object of the present invention is to provide a novel and useful disc loading/unloading apparatus in which the above described problems have been eliminated.

Another and more specific object of the present invention is to provide a disc loading/unloading apparatus which is able to reduce a load applied to a disc loading/unloading motor.

A further object of the present invention is to provide a disc loading/unloading apparatus which is able to securely perform positioning of a disc.

These and other objects are achieved in the disc loading/unloading apparatus of the present invention, driven by motor power in interlock with the insertion condition of a disc and pushing out the disc from the operating position outside the apparatus, which essentially includes positioning members for contacting the outer perimeter of the disc at spaced locations on the perimeter upon insertion of the disc into the opening, a spring for urging the positioning members against the outer perimeter of the disc for holding the disc in a loaded position and a disc ejection mechanism for ejecting the disc from the loaded position, including an unloading lever for pushing the disc toward the opening and rotatable cam for counteracting the biasing force of the spring and releasing the disc from the urging of the spring until the disc moves toward the opening beyond a predetermined position.

Additional objects, advantages and features of the present invention will further become apparent to persons skilled in the art from a study of following description and of the accompanying drawings.

DESCRIPTION OF THE PREFERRED EMBODIMENTS

Figure 1:
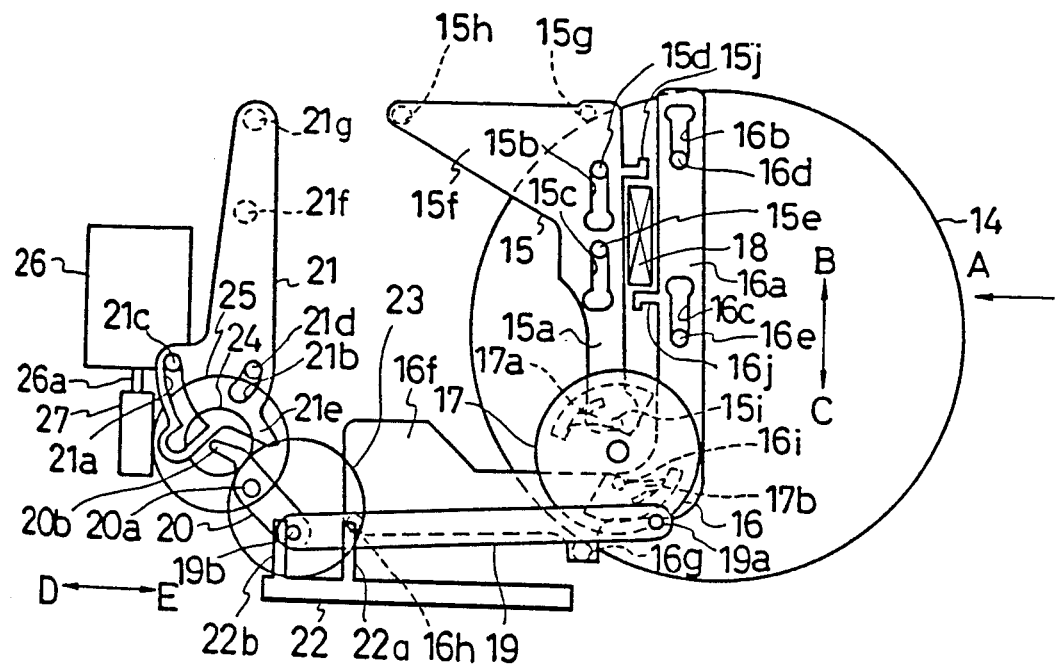
FIG. 1 is a plan view showing an embodiment of the disc loading/unloading apparatus according to the present invention.

The present invention will now be described in detail with reference to the accompanying drawings, namely, FIGS. 1 to 23. Throughout the drawings, like reference numerals and letters are used to designate like or equivalent elements for the sake of simplicity of explanation.

Referring now to FIG. 1, the numeral 14 is a disc and it is inserted into the disc loading/unloading apparatus by the hand of a user in the direction of arrow A in the drawing. On a front of the disc loading/unloading apparatus, there are provided a pair of positioning members 15 and 16 which are formed in substantially L-shape. A pair of first right and first left elongated holes 15b and 15c formed on a breadthwise portion 15a of first positioning member 15, which are elongated in the directions of arrows B and C in the drawing, are loosely fitted to a pair of first right and first left guide pins 15d and 15e on the main chassis (not shown) of a compact disc player. First positioning member 15 can freely be slid in the directions of arrows B and C in the drawing.

On a lengthwise portion 15f of first positioning member 15, which is elongated from the right end of breadthwise portion 15a of first positioning member 15 in the directions of arrows D and E in the drawing, a pair of first front and first rear positioning pins 15g and 15h which can be engaged with the periphery of disc 14 are located. Further, on the left end of breadthwise portion 15a of first positioning member 15, there is a first cam follower pin 15i to be engaged with a first cam portion 17a of a cam 17, described below. Also, on a front of breadthwise portion 15a of first positioning member 15, a first hook portion 15j is formed.

Second positioning member 16 is also formed in substantially L-shape as described above. A pair of second right and second left elongated holes 16b and 16e formed on a breadthwise portion 16a of second positioning member 16 are loosely fitted to second right and second left guide pins 16d and 16e projectedly provided on the main chassis, and second positioning member 16 can freely be slid in the directions of arrows B and C in the drawing.

On a lengthwise portion 16f of second positioning member 16, which is elongated from the left end of breadthwise portion 16a of second positioning member 16 in the directions of arrows D and E in the drawing, there is a pair of second front and second rear positioning pins 16g and 16h, which can be engaged with the periphery of disc 14. Further, on a corner portion of second positioning member 16, a second cam follower pin 16i to be engaged with a second cam portion 17b of cam 17 is projectedly provided. Also, on a rear of breadthwise portion 16a of second positioning member 16, a second hook portion 16j is formed.

A coil spring 18 is suspended between both first and second hook portions 15j and 16j of first and second positioning members 15 and 16, so that first and second positioning members 15 and 16 are biased in the directions of arrows C and B in the drawing, respectively.

Figure 2:
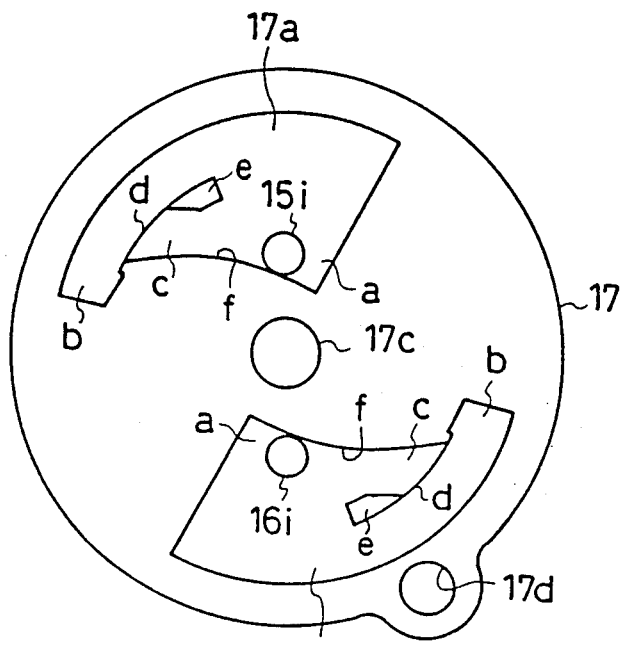
FIG. 2 is a plan view showing the construction of the essential parts of the embodiment.

Cam 17 is provided in a form as shown in FIG. 2. That is, cam 17 is formed in substantially disc-shape and is rotatably supported at its center by a shaft 17c projectedly provided on the main chassis. On one surface of cam 17, which faces to first and second positioning members 15 and 16, first and second cam portions 17a and 17b are depressed each in substantially a sector-shape on respective halves of cam 17 in symmetrical relation with each other about shaft 17c. Insular portions e are formed in each of the depressed portions. First and second cam follower pins 15i and 16i of first and second positioning members 15 and 16 are loosely fitted in first and second cam portions 17a and 17b, respectively.

First and second cam portions 17a said 17b are formed so that their clockwise direction ends or first ends a are wide in the radial direction of cam 17, and they become gradually narrower toward their counter-clockwise direction or second ends b as shown in FIG. 2. Therefore, first cam walls f are formed on inner parts of first and second cam portions 17a and 17b, and gradually increase their distances from the center of cam 17 in the direction from first ends a towards second ends b. Further, first and second cam portions 17a and 17b have slope portions c on their inner parts along first cam walls f, respectively, where their depths are gradually reduced toward second ends b. Respective slope portions c are terminated at second cam walls d which are ranging perpendicularly from second ends b to insular portions e as shown in FIG. 2, respectively. The depth of each second end b is substantially the same with that of each first end a, and second cam walls d constitute perpendicular steps between slope portions c and outer parts of respective first and second cam portions 17a and 17b near second ends b. Second cam walls d allow cam follower pins 15i and 16i of first and second positioning members 15 and 16 to move from slope portions c to the outer parts near second ends b, but prohibit them from moving from the outer parts near second ends b to slope portions c.

Further, a through-hole 17d is formed near a periphery of cam 17 adjacent to second cam portion 17b. As shown in FIG. 1, a first connection pin 19a provided on a front end of a connection rod 19 is loosely fitted to through-hole 17d. Also, on another end or a rear end of connection rod 19, a second connection pin 19b is provided. This pin 19b is loosely fitted to a through-hole formed on one end of a drive lever 20. Drive lever 20 is rotatably mounted substantially at its center portion on a mounting pin 20a projectedly provided on the main chassis. On another end of drive lever 20, a drive part 20b which can be engaged with an unloading lever 21 is formed.

Unloading lever 21 has formed on its one end long and short elongated arched holes 21a and 21b, and is movably supported on mounting pins 21c and 21d projectedly provided on the main chassis through long and short elongated arched holes 21a and 21b, as described after. Also, unloading lever 21 has formed on its one end a projected engaging portion 21e which can be engaged with drive part 20b of drive lever 20. On another end of unloading lever 21, a pair of first and second disc unloading pins 21f and 21g which can be engaged with the periphery of disc 14 are projectedly provided. First disc unloading pins 21f is located in a position closer to elongated arched holes 21a and 21b of unloading lever 21 than second disc unloading pins 21g.

Also, a control rod 22 is slidably supported on the main chassis near connection rod 19 in the directions of arrows D and E in the drawing. Control rod 22 includes a pair of front and rear engaging portions 22a and 22b. Front and rear engaging portions 22a and 22b project in parallel from control rod 22 in the directions of arrows B and C in the drawing, so that second connection pin 19b of connection rod 19 is located between them. Also, control rod 22 includes a rack pinion (not shown) and meshed with a first gear 23 rotatably supported on the main chassis through the rack pinion.

Further, first gear 23 is engaged with a second gear 24 of small diameter, which is also rotatably supported on the main chassis together with a third gear 25 of large diameter, which is coupled coaxially and in one body to second gear 24. Third gear 25 is meshed with a worm gear 27 fixed to a rotary shaft 26a of a motor 26 for loading and unloading disc 14 to and from the compact disc player.

The operation of the disc loading/unloading apparatus will be now described in detail below. Referring first to FIGS. 1 to 12, the loading operation of disc 14 is described.

As shown in FIG. 1, lengthwise portions 15f and 16f of first and second positioning members 15 and 16 are brought nearest to each other by the bias of coil spring 18 in the directions of arrows C and B, before disc 14 is inserted. At that time, as shown in FIG. 2, first and second cam follower pins 15i and 16i are pushed against first cam walls f of first and second cam portions 17a and 17b near their one ends a, respectively.

Figure 3:
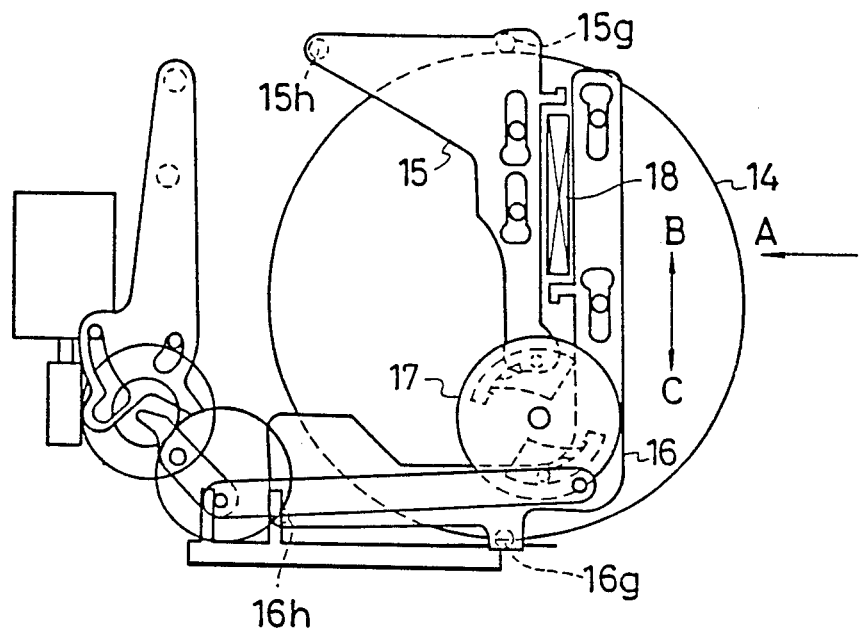
FIG. 3 to FIG. 7 are plan views for describing the operation upon inserting the disc.
Figure 8:
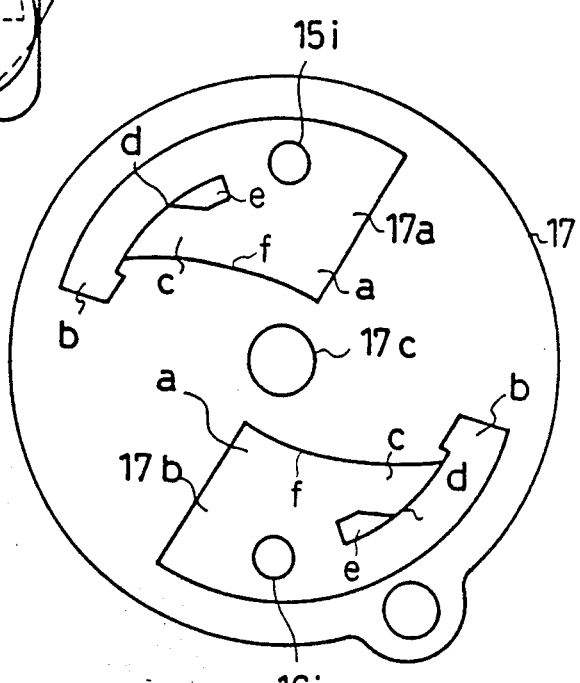
FIG. 8 to FIG. 12 are plan views showing the operation of the essential parts in the conditions shown in FIG. 3 to FIG. 7, respectively.

When disc 14 is pushed into the disc loading/unloading apparatus by the hand of a user in the direction of arrow A, the periphery of disc 14 engages with first front and second front positioning pins 15g and 16g of first and second positioning members 15 and 16 and then forces them to slide in the directions of arrows B and C against the biasing force of coil spring 18, as shown in FIG. 3. As a result, respective lengthwise portions 15f and 16f of first and second positioning members 15 and 16 are parted from each other in the directions of arrows B and C in the drawing. At that time, first and second cam follower pins 15i and 16i of first and second positioning members 15 and 16 are parted from first cam walls f of first and second cam portions 17a and 17b and are moved radially toward the outer parts of first and second cam portions 17a and 17b, as also shown in FIG. 8.

Figure 4:
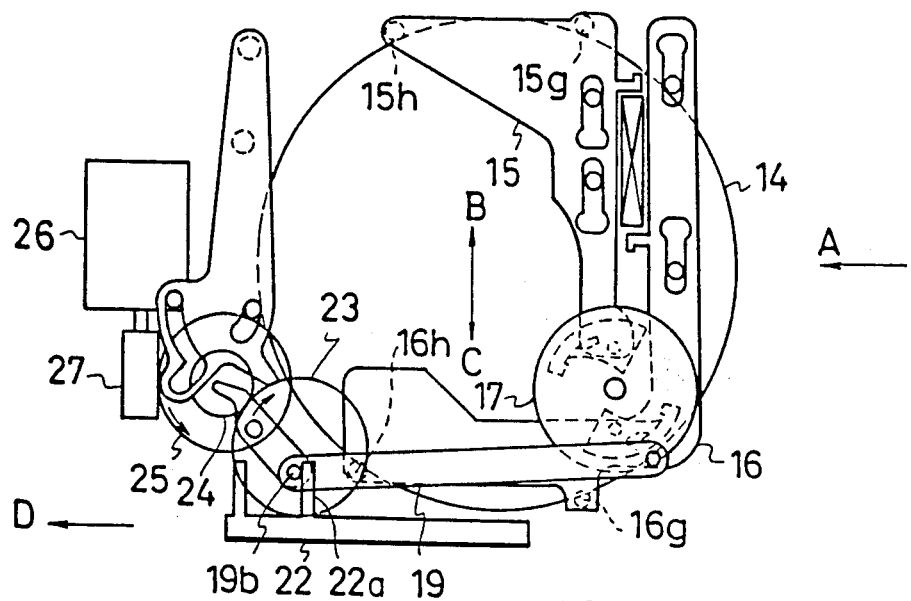
Figure 9:
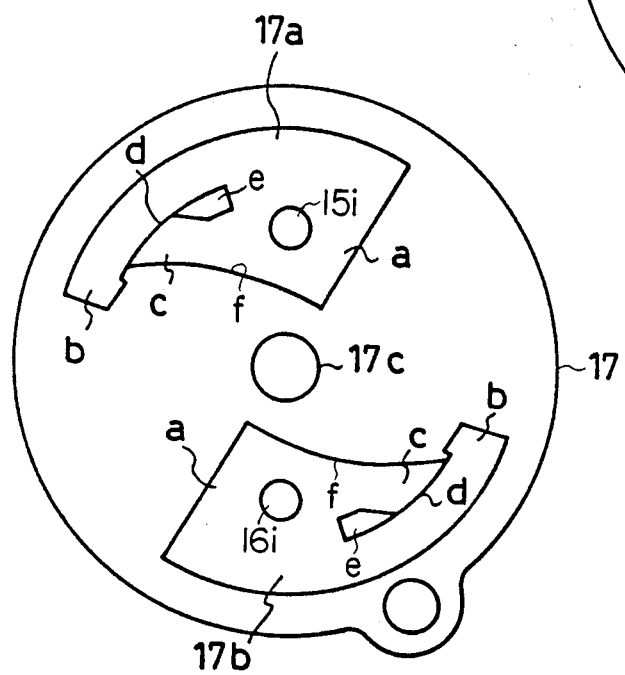

When disc 14 has been completely inserted, first and second positioning members 15 and 16 are somewhat returned in the directions of arrows C and B in the drawing according to the peripheral shape of disc 14 by the energizing force of coil spring 18, as shown in FIG. 4. Thus, positioning pins 15g, 15h, 16g and 16h of first and second positioning members 15 and 16 engage with the peripheral surface of disc 14 and disc 14 is correctly positioned. For this reason, as shown in FIG. 9, first and second cam follower pins 15i and 16i of first and second positioning members 15 and 16 are also somewhat returned from the positions shown in FIG. 8, and are located inside of first and second cam portions 17a and 17b, respectively.

Also, when disc 14 has been completely inserted as shown in FIG. 4, a microswitch (not shown) is turned ON so that motor 26 is activated. In this case, motor 26 is rotated so that third gear 25 is rotated in the counterclockwise direction in the drawing. Thus, first gear 23 is rotated through second gear 24 in the clockwise direction in the drawing and control rod 22 is slid in the direction of arrow D in the drawing.

Figure 5:
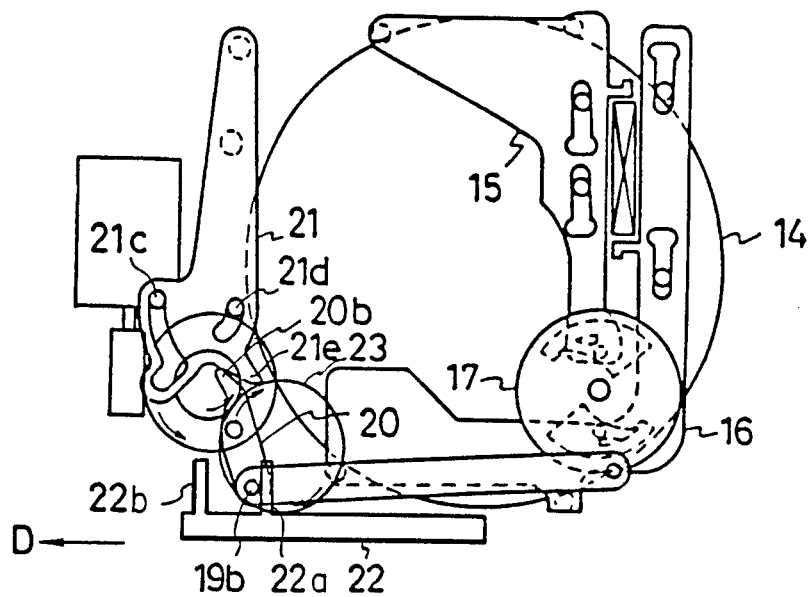
Figure 6:
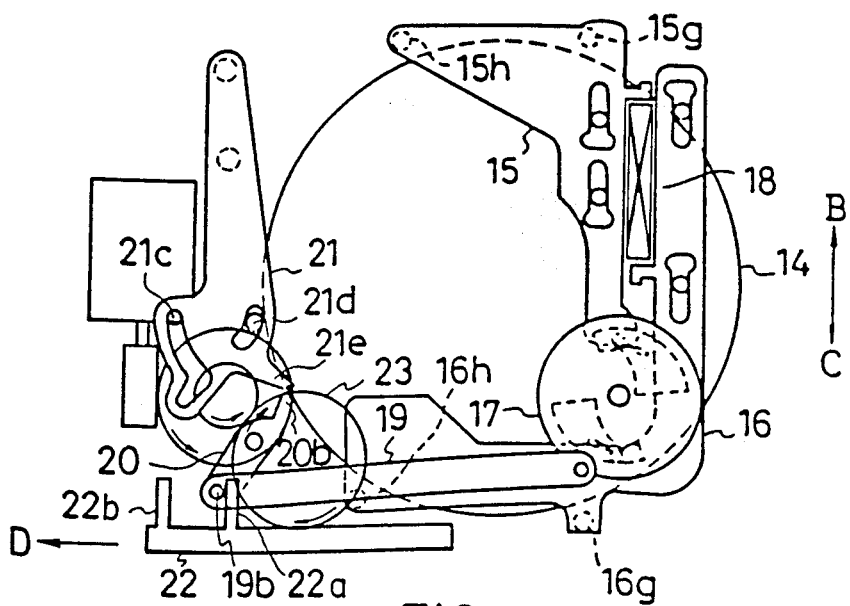

As a result, as shown in FIG. 5, front engaging portion 22a of control rod 22 pushes second connection pin 19b of connection rod 19, and as shown in FIG. 6, connection rod 19 is moved in the direction of arrow D in the drawing and cam 17 is rotated in the clockwise direction in the drawing. When control rod 22 is moved to the position shown in FIG. 7, the aforementioned microswitch or another microswitch (not shown) is driven to deactivate motor 26. Therefore, cam 17, connection rod 19 and control rod 22 are held at their respective positions shown in FIG. 7.

Figure 10:
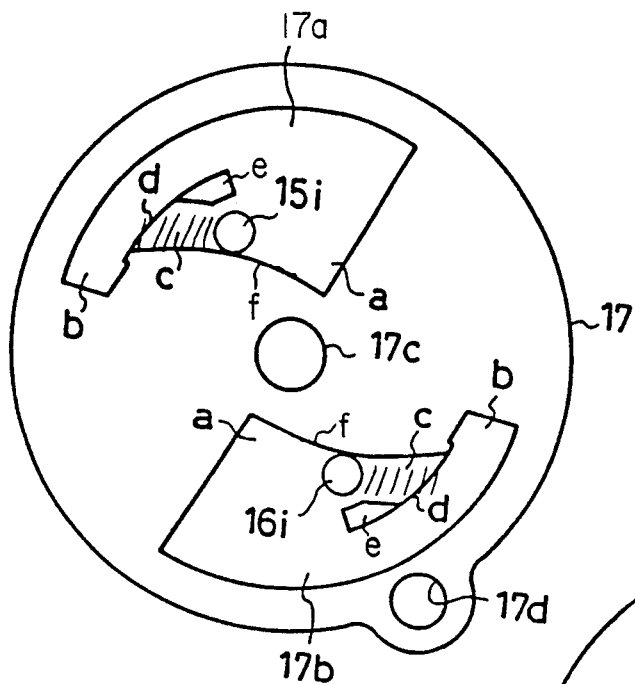
Figure 11:
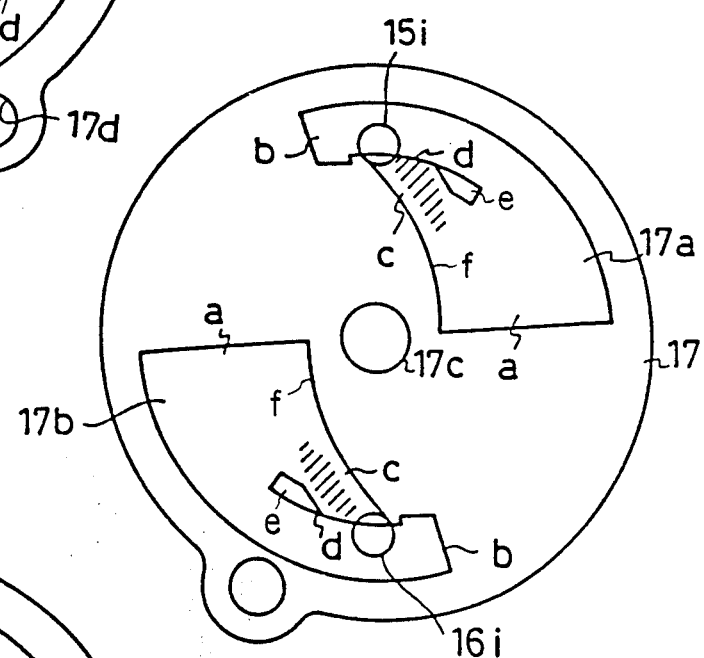

When cam 17 is rotated in the clockwise direction as shown in FIGS. 5 and 6, first and second cam follower pins 15i and 16i of first and second positioning members 15 and 16 are moved on slope portions c of first and second cam portions 17a and 17b toward second ends b in following first cam walls f, as shown in FIGS. 10 and 11. At that time, first and second positioning members 15 and 16 are parted from each other in the directions of arrows B and C, as shown in FIG. 6, against the energizing force of coil spring 18. As a result, positioning pins 15g, 15h, 16g, and 16h of lengthwise portions 15f and 16f are parted from the periphery of disc 14 and disc 14 becomes free to rotate. That is, disc 14 is then ready for playing in the compact disc player.

Figure 12:
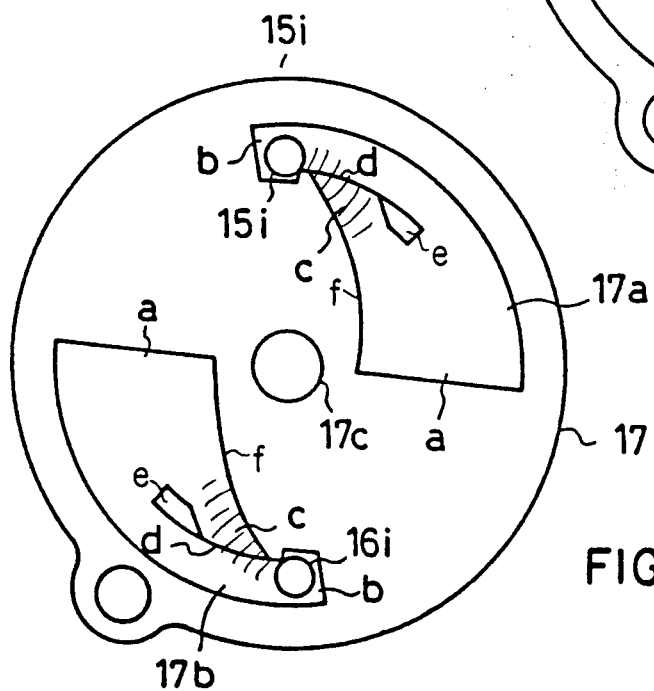

During the playing of disc 14 in the compact disc player, moter 26 is held deactivated. Accordingly, cam follower pins 15i and 16i are held in second ends b of first and second cam portions 17a and 17b as shown in FIG. 12 and positioning pins 15g, 15h, 16g, and 16h of lengthwise portions 15f and 16f are also held parted from the periphery of disc 14 so as not disturb the rotation of disc 14.

Figure 13:
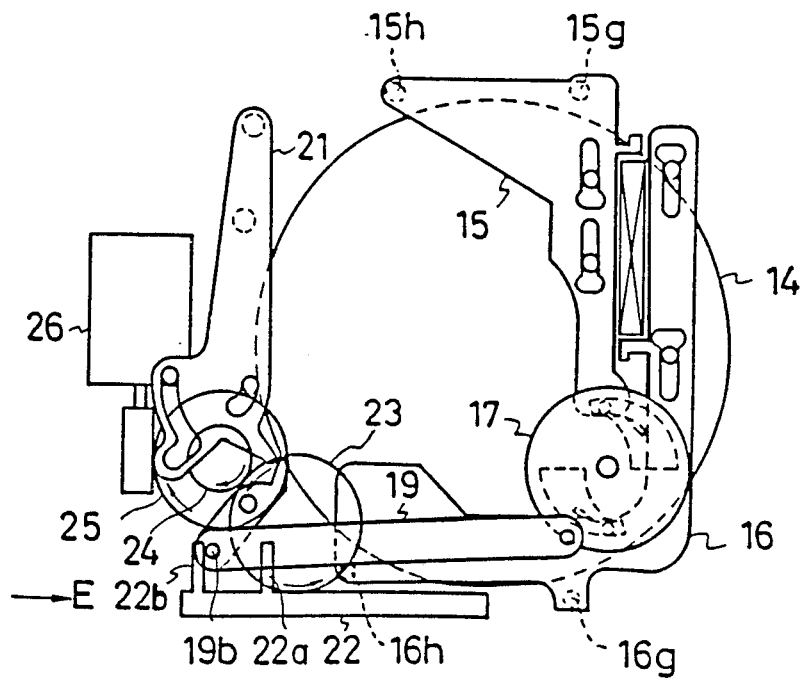
FIG. 13 to FIG. 17 are plan views for describing the operation on taking out the disc.

Referring now to FIGS. 13 to 22, the unloading operation of disc 14 is described in detail. When the reproducing operation of disc 14 has finished or a disc ejection key (not shown) is activated, motor 26 is again activated. The motor is rotated in the direction reverse to that of the aforementioned disc loading operation. Then, third gear 25 is rotated in the clockwise direction through worm gear 27. By this operation, first gear 23 is rotated in the counterclockwise direction through second gear 24, as shown in FIG. 13. Therefore, control rod 22 is driven in the direction of arrow E in the drawing.

Figure 14:
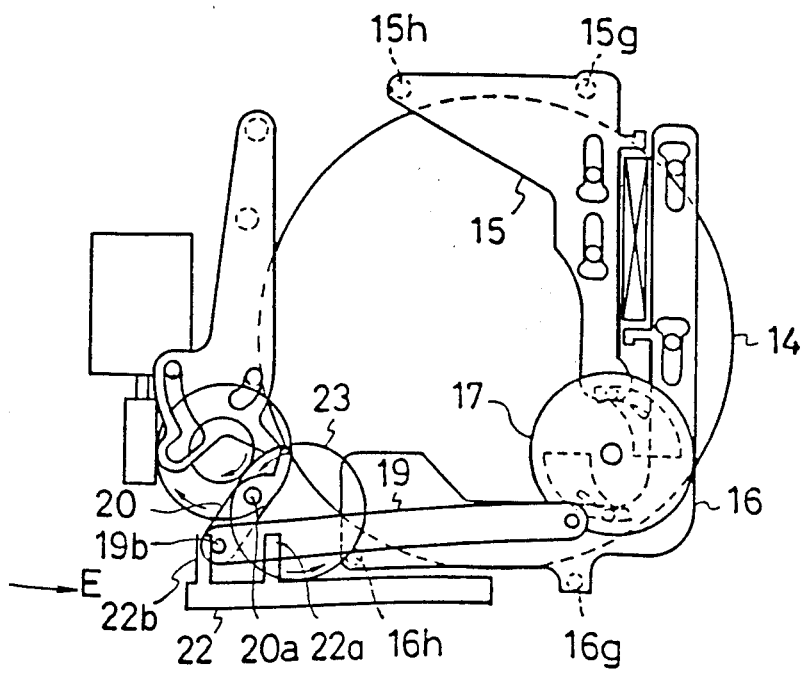

As a result, rear engaging portion 22b of control rod 22 pushes second connection pin 19b of connection rod 19, connection rod 19 is moved in the direction of arrow E and cam 17 is rotated in the counterclockwise direction as shown in FIG. 14. At this time, drive lever 20 is also rotated in the counterclockwise direction in the drawing about mounting pin 20a as the center, according to the movement of control rod 22.

Figure 15:
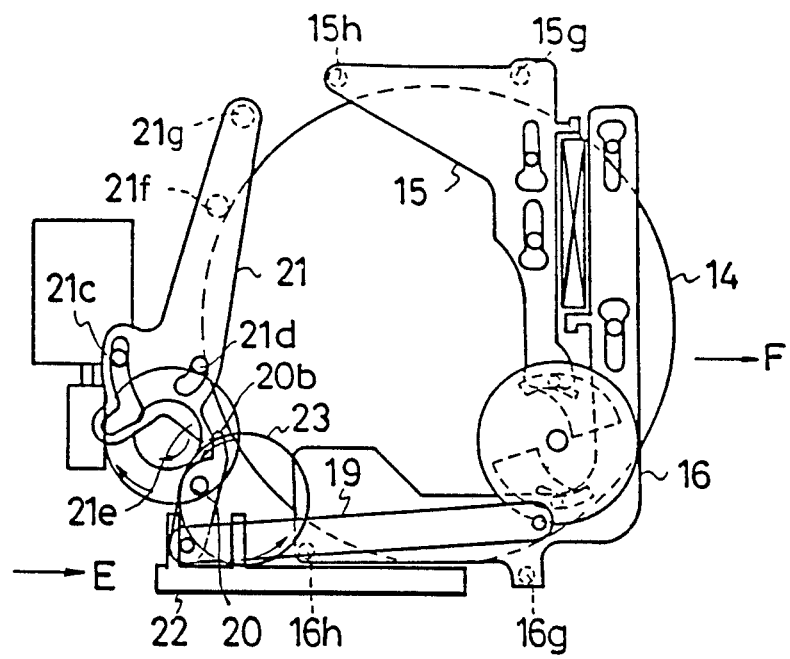
Figure 16:
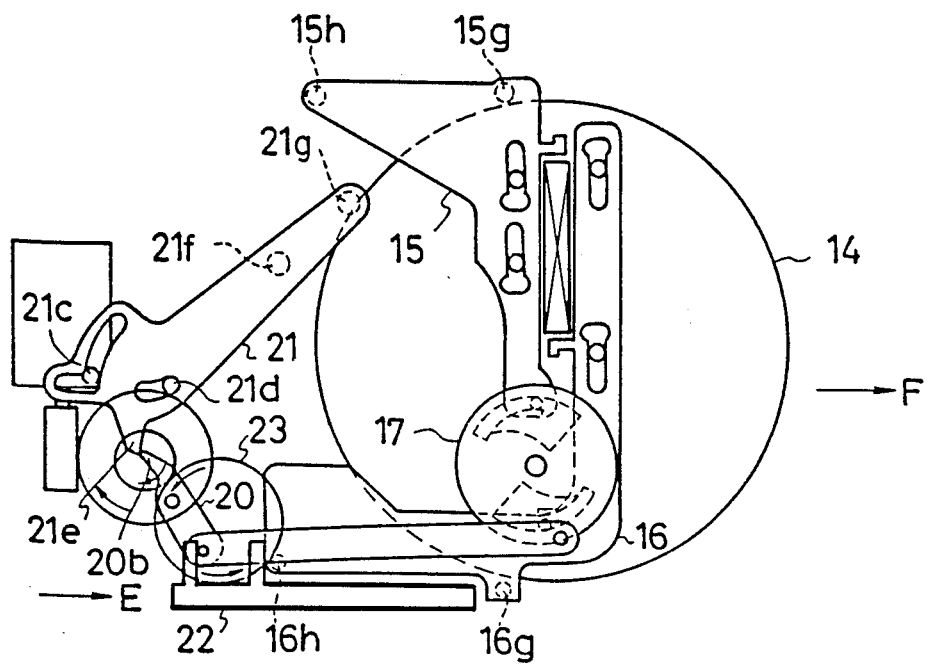

By this operation, drive portion 20b of drive lever 20 engages with engaging portion 21e of unloading lever 21 and pushes it to rotate in the clockwise direction in the drawing around mounting pin 21d of the main chassis as the center as shown in FIG. 15. As a result, first disc unloading pin 21f of unloading lever 21 pushes the peripheral of disc 14, and disc 14 is pushed in the direction of arrow F in the drawing. When drive lever 20 further rotates in the clockwise direction, unloading lever 21 also further rotates, as shown in FIG. 16. Second disc unloading pin 21g of unloading lever 21 then pushes the periphery of disc 14 in place of first disc unloading pin 21f, and a larger part of disc 14 is placed in front of first front and second front positioning pins 15g and 16g of first and second positioning menbers 15 and 16.

Figure 18:
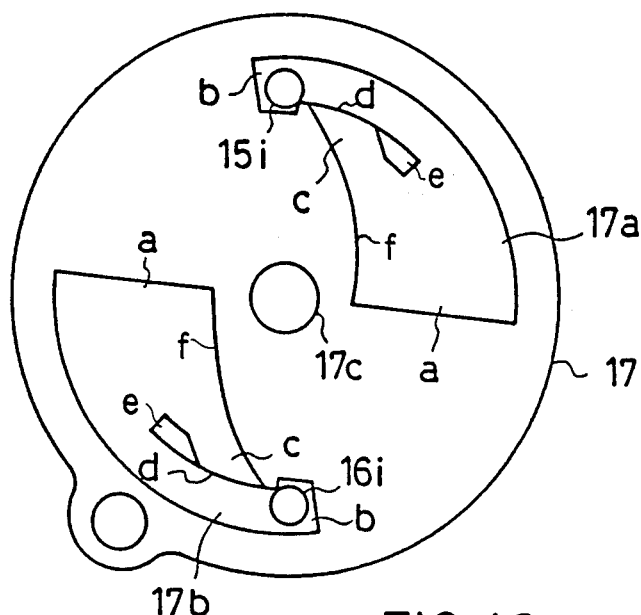
FIG. 18 to FIG. 22 are plan views showing the operation of the essential parts in the conditions shown in FIG. 13 to FIG. 17, respectively.
Figure 19:
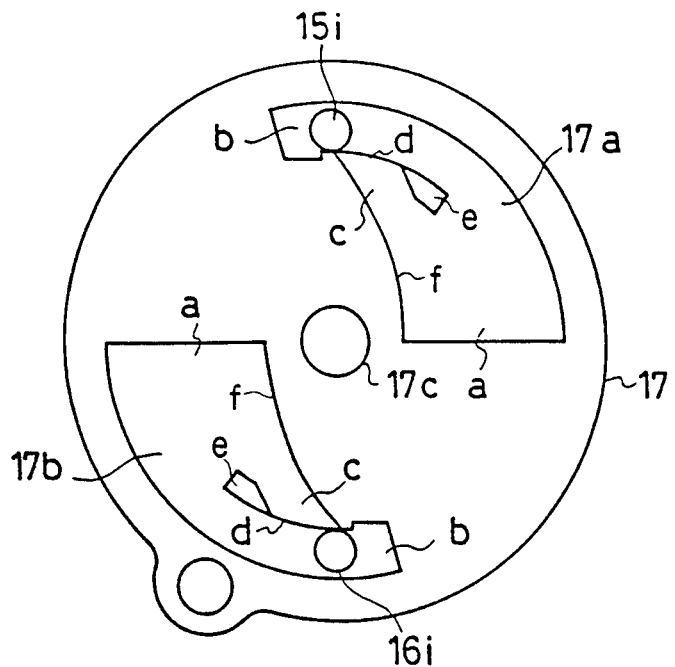
Figure 20:
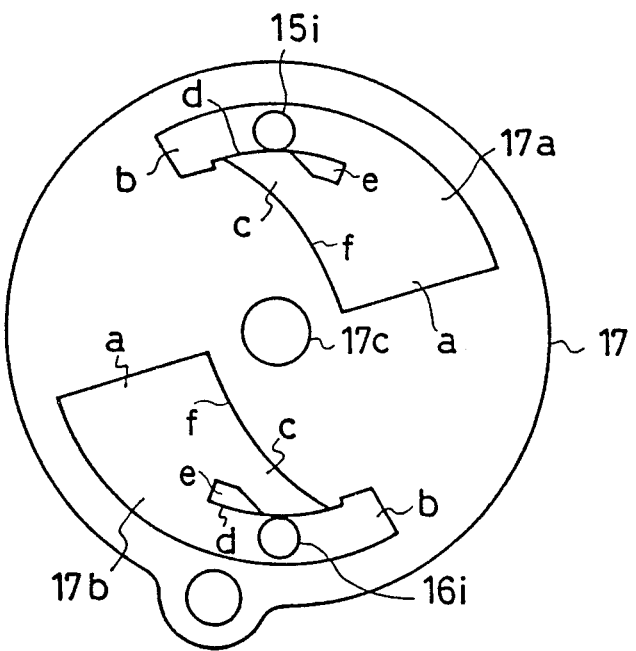

As the condition shown in FIG. 13 is transferred to that shown in FIG. 16, first and second cam follower pins 15i and 16i of first and second positioning members 15 and 16 are controlled in their positions by cam 17, as shown in FIGS. 18 to 20. That is, just prior to the unloading operation of disc 14, cam 17 is held in the rotated condition as shown in FIG. 18 which is the same as shown in FIG. 12. At this time, first and second cam follower pins 15i and 16i are loosely fitted to the outer parts of first and second cam portions 17a and 17b near second ends b and slidably contacted to second cam walls d of first and second cam portions 17a and 17b. When motor 26 is activated, first gear 23 is rotated in the counterclockwise direction as shown in FIG. 13 through gears 26, 25 and 24. First gear 23 drives control rod 22 to move in the direction of arrow E in the drawing. Then, cam 17 is rotated in the counterclockwise direction, as shown in FIGS. 18 to 20. During the counterclockwise rotation of cam 17, first and second cam follower pins 15i and 16i move along second cam walls d from second ends b to insular portions e without moving into slope portions c. The respective ends of slope portions c are reduced in depth with relation to the outer parts of first and second cam portions. 17a and 17b near second ends b.

For this reason, first and second positioning members 15 and 16 are held at the positions where positioning pins 15g, 15h, 16g, and 16h of first and second positioning members 15 and 16 are parted from the periphery of disc 14, as shown in FIGS. 14 and 15. Therefore, disc 14 is held free from first and second positioning members 15 and 16 until disc 14 is driven in the position as shown in FIG. 16 by unloading lever 21. That is, the unloading operation of disc 14 by unloading lever 21 is easily performed.

Figure 17:
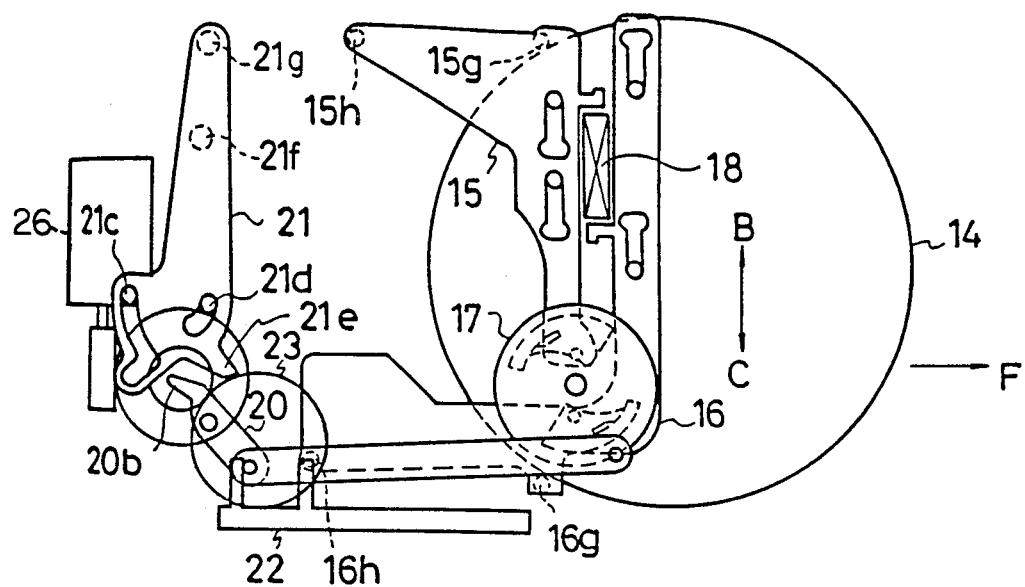
Figure 21:
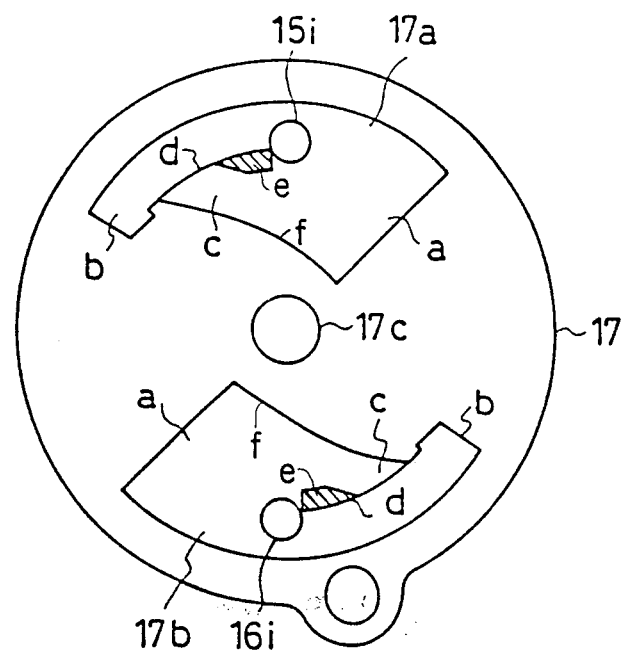
Figure 22:
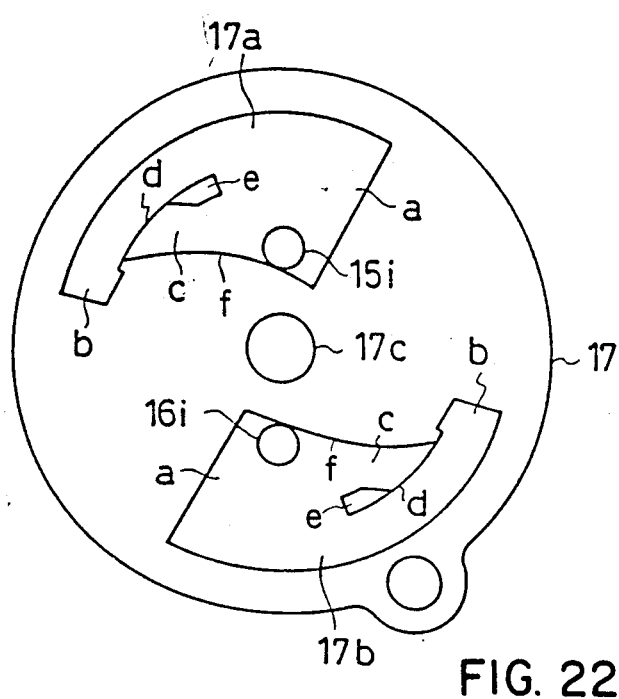

When first gear 23 is further rotated in the counterclockwise direction, cam 17 is rotated in the condition as shown in FIG. 21 so that first and second cam follower pins 15i and 16i of first and second positioning members 15 and 16 run off second cam walls d of first and second cam portions 17a and 17b. Then, first and second cam follower pins 15i and 16i return to the positions as shown in FIG. 22, which are the same as shown in FIG. 2, by the biasing forces of coil spring 18. Therefore, first front and second front positioning pins 15g and 16g engage with the periphery of disc 14 at the smaller part left behind them and further push out disc 14 in the direction of arrow F by means of the biasing force of coil spring 18, as shown in FIG. 17.

At that time, drive part 20b of drive lever 20 also runs off engaging portion 21e of unloading lever 21. Thus, unloading lever 21 returns to the position as shown in FIG. 17 by means of a spring (not shown). After first and second positioning members 15 and 16 and unloading lever 21 have returned to their original positions as shown in FIG. 17, a microswitch (not shown) is operated by control rod 22 to deactivate motor 26.

In this case, unloading lever 21 is controlled so that it is always held by the spring (not shown) at the position shown in FIG. 1 when no external force is applied, and it is automatically returned to its original position when drive portion 20b of drive lever 20 is disengaged from engaging portion 21e of unloading lever 21.

Figure 7:
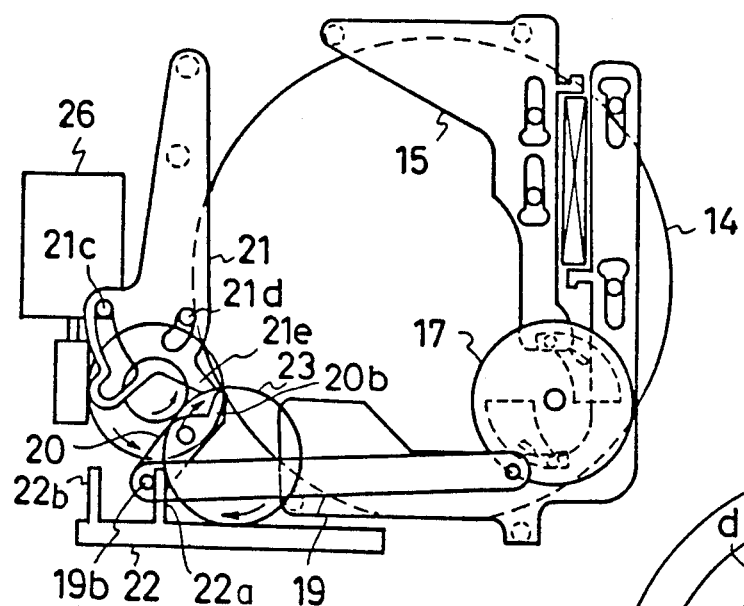

Next, a relation between drive lever 20 and unloading lever 21 during the loading operation of disc 14 will be further described. When disc 14 is inserted and control rod 22 is driven by motor 26 in the direction of arrow D in the drawing as shown in FIG. 4, drive lever 20 is rotated in the clockwise direction in the drawing and drive part 20b of drive lever 20 is pushed against engaging portion 21e of unloading lever 21 as shown in FIG. 5. As a result, unloading lever 21 is somewhat rotated about mounting pin 21c as the center in the counterclockwise direction as shown in FIG. 6. However, when control rod 22 reaches to the position as shown in FIG. 7, drive portion 20b of drive lever 20 runs off engaging portion 21e of unloading lever 21. Then, unloading lever 21 is returned again to its original position as shown in FIG. 1. Therefore, unloading lever 21 is always left in the condition not to disturb the movement of disc 14 in the loading operation of disc 14.

According to the embodiment of the disc loading/unloading apparatus as described above, after disc 14 has been positioned in a prescribed position by first and second positioning members 15 and 16, cam 17 is rotated by motor 26 so that first and second positioning members 15 and 16 are parted from disc 14 by means of first and second cam portions 17a and 17b formed on cam 17. Then, the disc loading/unloading apparatus is ready to play the disc. In the unloading operation of disc 14, first and second positioning members 15 and 16 are parted from disc 14 by means of first and second cam portions 17a and 17b until a larger part of disc 14 is pushed out by motor 26 through unloading lever 21. It is possible, therefore, to decrease the load on motor 26. The disc loading/unloading apparatus, therefore, is effective for promoting the miniaturization of disc loading/unloading motors, which results in the miniaturization of compact disc players and the like and the reduction of power consumption of disc loading/unloading motors.

Further, the timing of operation of first and second positioning members 15 and 16 can easily be set by changing the shape of first and second cam portions 17a and 17b.

As described above, the disc loading/unloading apparatus is so designed that first and second positioning members 15 and 16 are parted from disc 14 from the condition where disc 14 is in its correct playing position until the condition where a fixed part of disc 14 is pushed out from that position. This means is one of the features of the present invention.

Also, unloading lever 21 is rotated at a large stroke about mounting pin 21d as the center in the unloading operation of disc 14 so that disc 14 can be pushed out to the large extent. On the other hand, unloading lever 21 is rotated at a small stroke about mounting pin 21c as the center in the loading operation of disc 14 so that the rotation unloading lever 21 is prevented from disturbing the movement of disc 14 and the load of unloading lever 21 applied against motor 26 can be decreased. Further, the relation between unloading lever 21 and drive lever 20 can result in a stable and secure operation.

The present invention is not limited to the embodiment described above. It may be embodied in several forms without departing from the spirit of essential characteristics of the invention.

As described above in detail, the present invention can provide an extremely satisfactory disc loading/unloading apparatus which can decrease the load applied to the motor and can securely perform the positioning of the disc to a correct playing position in the disc player.

What is claimed is:

1. A disc loading/unloading apparatus for a disc player having a loading/unloading opening therein, comprising:
   positioning means for contacting the outer perimeter of the disc at spaced locations on the perimeter upon insertion of the disc into the opening, the positioning means including at least first and second positioning members, said first and second positioning members contacting the perimeter of the disc at four spaced locations;
   biasing means for urging the positioning members against the outer perimeter of the disc for holding the disc in a loaded position; and
   means for ejecting the disc from the loaded position, including unloading means for pushing the disc toward the opening, and rotatable cam means cooperating with said unloading means for counteracting the biasing force of the biasing means and moving said positioning members to a released position out of contact with the disc until the disc moves toward the opening beyond a predetermined position.

2. The apparatus of claim 1 wherein the cam means includes at least a first cam portion for moving the positioning members against the bias of the biasing means to the released position, and a second cam portion for maintaining the positioning members in the released position until at least one half of the disc has moved beyond the positioning members toward the opening.

3. The apparatus of claim 2 wherein each of the positioning members includes a front positioning pin and a rear positioning pin for contacting the perimeter of the disc at four spaced locations, and the biasing means includes a coil spring for urging the first and second positioning members together.

4. The apparatus of claim 2 wherein the cam means includes a cam having a generally circular outer surfaces, and a pair of cam follower pins, one of the follower pins interacting with each of the first cam portion and the second cam portion, respectively.

5. The apparatus of claim 2 wherein the first and second cam portions comprise symmetrically arranged depressed portions having a generally sector-shaped configuration on the cam.

6. The apparatus of claim 5 wherein each depressed portion includes a first gradually curved wall extending from a point near the center of the cam outward toward the outer surface, and a second gradually curved wall intersecting with the first wall.

7. A disc loading/unloading apparatus for a disc player having a loading/unloading opening therein, comprising:
   (a) positioning means for contacting the outer perimeter of the disc at spaced locations on the perimeter upon insertion of the disc into the opening, the positioning means including at least first and second positioning members;
   (b) biasing means for urging the positioning members against the outer perimeter of the disc for holding the disc in a loaded position; and
   (c) means for ejecting the disc from the loaded position, including unloading means for pushing the discs toward the opening, and rotatable cam means for counteracting the biasing force of the biasing means and moving the positioning members to a released position out of contact with the disc until the disc moves toward the opening beyond a predetermined position, the cam means including:
   first and second cam follower pins respectively mounted on said first and second positioning member; and
   a cam having a generally circular outer surface, a first cam portion for engaging the cam follower pins and moving the positioning members against the biasing means and to the released position, and a second cam portion for engaging the cam follower pins and maintaining the positioning members in the released position until at least one half of the disc has moved beyond the positioning members toward the opening, the first and second cam portions comprising symmetrically arranged depressed portions have a generally sector-shaped configuration, each of the depressed portions including a first gradually curved wall extending from a point near the center of the cam outward toward the outer surface and a second gradually curved wall intersecting the first wall, the surface of the depressed portion being sloped between the first and second walls, and the second wall defining a step for supporting the cam follower pins.

8. The apparatus of claim 7 wherein the second wall includes an offset portion at one end for receiving the cam follower pin when the positioning members are in the released position.

9. The apparatus of claim 7 wherein the depressed portions each includes a raised insular area at the other end of the second wall.

10. A disc loading/unloading apparatus for a disc player having a loading/unloading opening therein, comprising:
    means for loading the disc into the disc player through the opening; and
    means responsive to an eject command for ejecting the disc, including reversible drive means for powering the ejection means, and dual fulcrum unloading lever means for pivoting in one direction on a first fulcrum for ejecting the disc when the drive means operates in one direction and pivoting in the opposite direction on a second fulcrum when the drive means operates in the reverse direction.

11. The apparatus of claim 10 wherein the first and second fulcrums are positioned for pivoting the lever means a greater degree about the first fulcrum than the second fulcrum.

12. The apparatus of claim 11 wherein the drive means includes a drive lever and the lever means includes an engaging portion for interacting with the drive lever for pivoting the lever means about the fulcrums, the distance from the point of interaction of the drive lever and the engaging portion to each fulcrum being different.

13. The apparatus of claim 12 wherein the drive means includes a rack and pinion for controlling the movement of the drive lever, and the lever means includes at least one unloading pin for engaging the perimeter of the disc toward the opening when the lever means is pivoted on the first fulcrum.

14. The apparatus of claim 13 wherein the lever means includes a pair of mounting pins and a lever arm having a long arched hole and a short hole therein, each of the holes being sized for receving one of the mounting pins for pivotal rotation thereon.

* * * * *